(12) United States Patent
Larmo et al.

(10) Patent No.: US 9,191,870 B2
(45) Date of Patent: Nov. 17, 2015

(54) HANDOVER METHOD FOR REDUCING THE AMOUNT OF DATA FORWARDED TO A TARGET NODE

(75) Inventors: Anna Larmo, Espoo (FI); Parth Ileshkumar Amin, Espoo (FI); Johan Torsner, Masaby (FI); Stefan Wager, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 217 days.

(21) Appl. No.: 13/388,030

(22) PCT Filed: Aug. 10, 2009

(86) PCT No.: PCT/SE2009/050923
§ 371 (c)(1),
(2), (4) Date: Jan. 30, 2012

(87) PCT Pub. No.: WO2011/019308
PCT Pub. Date: Feb. 17, 2011

(65) Prior Publication Data
US 2012/0129530 A1    May 24, 2012

(51) Int. Cl.
*H04W 36/00* (2009.01)
*H04W 36/02* (2009.01)
(52) U.S. Cl.
CPC .................................... *H04W 36/02* (2013.01)
(58) Field of Classification Search
None
See application file for complete search history.

(56) References Cited

U.S. PATENT DOCUMENTS

| 2007/0291695 A1* | 12/2007 | Sammour et al. | 370/331 |
| 2008/0045219 A1* | 2/2008 | Terry | 455/436 |
| 2008/0188223 A1 | 8/2008 | Vesterinen et al. | |
| 2008/0254800 A1 | 10/2008 | Chun et al. | |
| 2009/0303893 A1* | 12/2009 | Lee et al. | 370/252 |
| 2010/0189074 A1* | 7/2010 | Liao | 370/331 |

FOREIGN PATENT DOCUMENTS

| WO | WO 2008/085842 A1 | 7/2008 |
| WO | WO 2009/075549 A1 | 6/2009 |

OTHER PUBLICATIONS

Nokia Corporation, Nokia Siemens Networks, Refinement of Polling Triggers, 3GPP TSG-RAN WG2 Meeting #62bis, Warsaw, Poland, Jun. 30-Jul. 4, 2008.*

(Continued)

*Primary Examiner* — German J Viana Di Prisco
(74) *Attorney, Agent, or Firm* — Myers Bigel Sibley & Sajovec, P.A.

(57) ABSTRACT

Method and arrangement in a source radio network node for reducing the amount of user equipment related data forwarded to a target radio network node, when performing a handover of a user equipment. The method comprises determining that the user equipment is to perform a handover from the source radio network node to the target radio network node, increasing the polling frequency of polls sent to the user equipment, transmitting a poll to the user equipment, receiving a status message from the user equipment, as a response to the transmitted poll, dropping the data which, according to the received status message have been acknowledged by the user equipment, and forwarding the data which have not been acknowledged by the user equipment according to the received status message, to the target radio network node.

12 Claims, 4 Drawing Sheets

(56) References Cited

OTHER PUBLICATIONS

R2-083160—Value Ranges for RLC Parameters, Ericsson, 3GPP TSG-RAN WG2 Meeting #62bis, Warsaw, Poland, Jun. 30-Jul. 4, 2008.*

International Search Report, PCT Application No. PCT/SE2009/050923, May 4, 2010.

3GPP Draft, R2-063389, Nov. 13, 2006: "Inter-eNB Handover (UP)", 3rd Generation Partnership Project (3GPP), Mobile Competence Centre, NTT DoCoMo; Inc, Sections 2.1, 2.2, 2.3, 3.

3GPP Draft, R3-060412, Mar. 30, 2006: "Re-synchronization mechanism for lossless/no duplication handover", 3rd Generation Partnership Project (3GPP), Mobile Competence Centre, NTT DoCoMo; Inc, See the whole document.

"Universal Mobile Telecommunications System (UMTS); Radio Link Control (RLC) protocol specification (3GPP TS 25.322 version 8.5.0 Release 8)," ETSI TS 125 322 V8.5.0 (Jul. 2009) Technical Specification, 91 pages.

"Universal Mobile Telecommunications System (UMTS); Radio Resource Control (RRC) Protocol specification (3GPP TS 25.331 version 8.7.0 Release 8)," ETSI TS 125 331 V8.7.0 (Jul. 2009) Technical Specification, Section 8.6.4.9, pp. 1-2, 389-392.

* cited by examiner

HANDOVER METHOD FOR REDUCING THE AMOUNT OF DATA FORWARDED TO A TARGET NODE

CROSS REFERENCE TO RELATED APPLICATIONS

This application is a 35 U.S.C. §371 national stage application of PCT International Application No. PCT/SE2009/050923, filed on 10 Aug. 2009, the disclosure and content of which is incorporated by reference herein in its entirety. The above-referenced PCT International Application was published in the English-language as International Publication No. WO 2011/019308 A1 on 17 Feb. 2011.

TECHNICAL FIELD

The disclosed subject matter relates to various embodiments of a method and an arrangement in a source radio network node. More particularly, the present invention relates to an improved data forwarding mechanism, for reducing forwarded information when performing a handover in a wireless communication system.

BACKGROUND

Functionality to handle user mobility is a fundamental component in wireless communication systems such as cellular networks. From a service quality perspective, such functionality must ensure that service continuity is maintained as user equipments move from one cell to another during an active session, and that each new session is established in a sufficiently good radio environment. From a spectral efficiency perspective, such functionality should ensure that an active user is always served by the most appropriate base station or base stations, which typically may be the closest base station or base stations, and/or the base station or base stations that provide the best radio propagation conditions, at a particular moment.

The 3rd Generation Partnership Program (3GPP) is currently standardizing a new radio access system called the Long Term evolution (LTE) of 3G. Just as some preceding systems, this system will include radio protocols intended to minimize the loss of data over the radio link. The protocol stack includes mechanisms to ensure lossless handover (HO) functionality, and to be specific, the Packet Data Convergence Protocol (PDCP) and the Radio Link Control (RLC) protocols are used for this purpose.

To enable lossless handover functionality, the Radio Bearer (RB) is configured to use the RLC protocol in Acknowledged Mode (AM), and the corresponding PDCP mode for Data RBs (DRB). Each PDCP Protocol Data Unit (PDU) is given to RLC for transmission. The RLC AM functions so that each RLC PDU sent out must be acknowledged (ACKed) by the receiver side to the transmitter side. Acknowledgements (ACKs) are sent upon a POLL request from the transmitter i.e. the serving radio node, and upon T_reOrdering timer expiry at the receiver side, in case the T_Status_Prohibit timer is not running. If the T_Status_Prohibit is running, the RLC STATUS is sent upon the expiry of the timer. The RLC entity receives/delivers RLC Service Data Units (SDU) from/to upper layer and sends/receives RLC PDUs to/from its peer RLC entity via lower layers. One RLC PDU can contain a various number of PDCP PDUs, or segments thereof, according to the instantaneous link bitrate. Upon reception of an ACK for a whole RLC SDU, the RLC protocol must indicate the successful delivery of the higher layer PDU to the higher layer, i.e., to the PDCP transmitter. To ensure a lossless handover, the PDCP transmitter should not discard SDUs from it's buffer before it has received the indication of successful delivery from the RLC transmitter.

Below the RLC layer, a Hybrid ARQ (HARQ) protocol at the MAC level is responsible for the transmission and retransmission of the packets. The HARQ is usually configured so that there is a high probability of the data transmitted from the source radio network node such as e.g. a source eNB, to be successfully received by the User Equipment (UE) without involving retransmissions.

The source radio network node is the node which at the moment is serving the user equipment. The target radio network node, or target eNB, is the node into which the handover is to be performed as the user equipment is moving into the geographical area covered by that radio network node.

During the handover, all the PDCP SDUs that have not been acknowledged by the lower layer are forwarded to the target radio network node from the source radio network node.

The source radio network node may start the data forwarding after it receives handover request acknowledgement from the target radio network node. The user equipment moves to the target radio network node after receiving the handover command from the source radio network node. When in the target cell, the user equipment sends handover confirmation message to the target radio network node. At this stage, the user equipment may also transmit a PDCP Status report if so configured. After reception of the PDCP Status report, the target radio network node may discard the PDCP SDUs that have already been received by the user equipment in the source cell. If the user equipment is not configured to transmit the PDCP Status report to the target radio network node, the target radio network node will transmit all the forwarded SDUs.

A problem with the existing data forwarding mechanism is that the source radio network node is unaware of the latest information of what data the user equipment has received and what it has not received.

During the handover, all the unacknowledged PDCP SDUs are forwarded to the target radio network node by the source radio network node via X2 interface. Many PDCP SDUs that are forwarded to the target radio network node have already been successfully received at the user equipment, and are either dropped at the target radio network node or at the user equipment. Thus, the problem is the inefficient data forwarding mechanism between the source radio network node and target radio network node, which unnecessarily increases the load on the data link X2 connecting the source radio network node and target radio network node.

Since the RLC ACK procedure depends on the POLL and T_reOrdering settings, it could be that many of those SDUs have already been successfully delivered to the user equipment, and would not need to be forwarded to the target radio network node.

A first proposed solution is that the source radio network node polls the user equipment once just after receiving the MEASUREMENT_REPORT from the user equipment. Another proposed solution is to send the RLC status report along with the MEASUREMENT_REPORT in the uplink. The latter solution however requires changes in the 3GPP LTE Release specification 36.331 and 36.322.

Another solution is to send a PDCP Status instead of RLC STATUS message to the source radio network node before the user equipment detaches from the source. This solution requires changes to the 3GPP LTE Release specification 36.331 and 36.323, and has so far not been accepted to be part of the specification.

SUMMARY

It is the object to obviate at least some of the above disadvantages and provide an improved performance in a wireless communication system.

The object is achieved by a method in a source radio network node for reducing the amount of user equipment related data forwarded to a target radio network node. The data is forwarded to the target radio network node from the source radio network node, when performing a handover of a user equipment. The handover of the user equipment is made from the source radio network node to the target radio network node. The source radio network node, the target radio network node and the user equipment are comprised in a wireless communication system. The method comprises determining that the user equipment is to perform a handover from the source radio network node to the target radio network node. Also, the method comprises increasing the polling frequency of polls sent to the user equipment. Further the method comprises transmitting a poll to the user equipment. In addition, the method comprises receiving a status message from the user equipment, as a response to the transmitted poll. Further yet, the method also comprises dropping the data which, according to the received status message have been acknowledged by the user equipment. Additionally, the method further comprises forwarding the data which have not been acknowledged by the user equipment according to the received status message, to the target radio network node.

The object is also achieved by an arrangement in a source radio network node. The arrangement is configured for reducing the amount of user equipment related data forwarded to a target radio network node. The data is forwarded to the target radio network node from the source radio network node, when performing a handover of a user equipment. The handover is made from the source radio network node to the target radio network node. The source radio network node, the target radio network node and the user equipment are comprised in a wireless communication system. The arrangement comprises a determination unit. The determination unit is adapted to determine that the user equipment is to perform a handover from the source radio network node to the target radio network node. Further, the arrangement comprises a polling frequency regulating unit. The polling frequency regulating unit is adapted to adjust the polling frequency of polls sent to the user equipment. In addition, the arrangement comprises a transmitter. The transmitter is adapted to transmit a poll to the user equipment. In further addition, the arrangement also comprises a receiver. The receiver is adapted to receive a status message from the user equipment, as a response to the transmitted poll. Also, furthermore, the arrangement comprises a reducing unit. The reducing unit is adapted to drop the data which, according to the received status message have been acknowledged by the user equipment. Additionally, the arrangement further comprises a forwarding unit. The forwarding unit is adapted to forward the data which have not been acknowledged by the user equipment according to the received status message, to the target radio network node.

As the source radio network node has received the latest status update from the user equipment, PDCP at the source radio network node drops the acknowledged data and just forwards the unacknowledged data to the target radio network node. It reduces the PDCP buffer size during the handover at the source radio network node, resulting to less data being forwarded between the source radio network node and target radio network node. This reduces the load on the data link connecting the source radio network node and target radio network node and also on the air interface between the target radio network node and the user equipment. Thereby, an improved performance in a wireless communication system is provided.

Other objects, advantages and novel features of the invention will become apparent from the following detailed description of the invention.

BRIEF DESCRIPTION OF THE DRAWINGS

The present methods and arrangements will now be described more in detail in relation to the enclosed drawings, in which.

DETAILED DESCRIPTION

The disclosed subject matter relates to various embodiments of a method and an arrangement in a radio access network which may be put into practice in the embodiments described below. The disclosed subject matter may, however, be embodied in many different forms and should not be construed as limited to the embodiments set forth herein; rather, these embodiments are provided so that this disclosure will be thorough and complete, and will fully convey the scope of the present methods and arrangements. It should be understood that there is no intent to limit the present method and arrangement to any of the particular forms disclosed, but on the contrary, the present methods and arrangements are to cover all modifications, equivalents, and alternatives falling within the scope of the methods and arrangements as defined by the claims.

Figure 1:
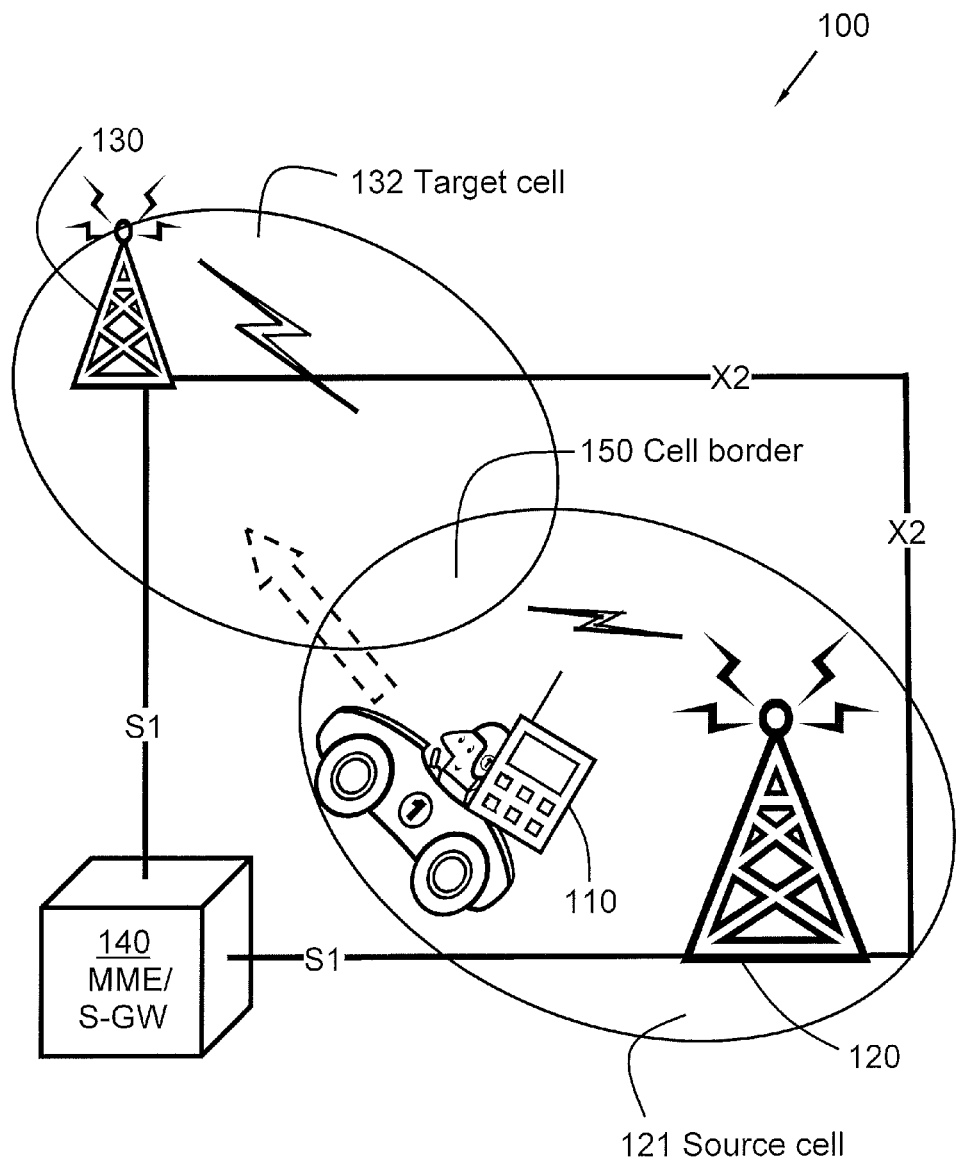
FIG. 1 is a schematic block diagram illustrating a wireless communication system according to some embodiments.

FIG. 1 is a schematic illustration over a wireless communication system 100. A user is managing a user equipment 110, within the wireless communication system 100. Further, the wireless communication system 100 may comprise a source radio network node 120, in a source cell 121 and a target radio network node 130, in a target cell 132. The source cell 121 and the target cell 132 are separated by a cell border 150.

Although two radio network nodes 120, 130 are shown in FIG. 1, it is to be understood that another configuration of radio network nodes 120, 130 may be connected through, for example, a mobile switching centre and other network nodes, to define the wireless communication system 100. Further, each of the radio network nodes 120, 130 may be referred to as e.g. a base station, a Remote Radio Unit (RRU), an access point, a Node B, an evolved Node B (eNode B or eNB) and/or a base transceiver station, Access Point Base Station, base station router, etc depending e.g. of the radio access technology and terminology used.

In some embodiments, the user equipment (UE) 110 may be represented by a wireless communication device, a wireless communication terminal, a mobile cellular telephone, a Personal Communications Systems terminal, a Personal Digital Assistant (PDA), a laptop, a computer or any other kind of device capable of managing radio resources.

The wireless communication system 100 may be based on technologies such as e.g. Global System for Mobile Telecommunications (GSM), Code division multiple access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) etc, just to mention some few non-limiting examples.

Further, as used herein, wireless communication system 100 may refer to various radio access technologies in the traditional sense, a wireless local area network (LAN) or a wireless personal area network without departing from the teachings of the present invention. These networks may comprise, for example, radio access technologies, such as Enhanced Data rates for GSM Evolution (EDGE), General Packet Radio Service (GPRS), High Speed Packet Data Access (HSPA), Universal Mobile Telecommunications System (UMTS) and/or Wireless Local Area Networks (WLAN), such as Wireless Fidelity (WiFi) and Worldwide Interoperability for Microwave Access (WiMAX), Bluetooth or according to any other wireless communication technology.

However, the herein illustrated and described examples of the present methods and arrangements are situated in a context of Long Term Evolution (LTE) within the 3GPP.

The radio network nodes 120, 130 are adapted to communicate with each other, and possibly also with other radio network nodes e.g. over an X2 interface.

The wireless communication system 100 may further according to some embodiments comprise a Mobility Management Entity (MME) 140. The Mobility Management Entity 140 is a control node responsible e.g. for idle mode user equipment tracking and paging procedure, including retransmissions. Further, the Mobility Management Entity 140 may be involved in the bearer activation/deactivation process and may further be responsible for choosing the signalling gateway (SGW) for the user equipment 110 at the initial attach and at time of handover involving Core Network node relocation. The Mobility Management Entity 140 is prepared to communicate with the radio network nodes 120, 130 e.g. over an S1 connection. S1 is an interface application protocol creating an interface between the core network and the wireless communication system 100.

The user equipment 110 may communicate with other user equipments, or network nodes not shown in FIG. 1, via any, some or all of the radio network nodes 120, 130 comprised within the wireless communication system 100.

FIG. 1 further illustrates the user equipment 110 as it moves from the source cell 121 towards the target cell 132, approaching the cell border 150. Somewhere, probably close to the cell border 150 in FIG. 1, the target cell 132 becomes the best cell. The user equipment 110 may at this point send a Measurement Report indicating that a handover to the target cell 132 may be performed. At that point in time, it may be determined to initiate a handover from the source cell 121 to the target cell 132, based on e.g. the received Measurement Report.

The present solution provides a method for reducing the data forwarding from the source radio network node 120 to the target radio network node 130 by increasing the polling frequency just before a handover is performed in case there is outstanding data in the RLC transmitter buffer. This allows the source radio network node 120 to be as up to date to the reception state of the user equipment 110 as possible, and thus reduces the number of unacknowledged PDCP SDUs to be forwarded to target radio network node 130.

The proposed functionality may be achieved by, e.g., decreasing the value of the pollByte parameter in the RLC configuration of the source radio network node 120 before the handover. As the value of the pollByte is decreased, the polling will be performed more often, and in turn the user equipment 110 responds with a status message, such as e.g. a RLC status message more frequently.

In the following, the Radio Link Control protocol may be used as an example of a status message. However, the present solution is not limited to using the Radio Link Control protocol. Any other appropriate protocol such as e.g. PDCP may be used, according to some embodiments.

Thus, according to the present solution, polls are sent to the user equipment 110 more frequently just before an upcoming handover, compared to the normal case where no handover is expected. As the source radio network node 120 polls the user equipment 110 more frequently, the user equipment 110 in turn responds with a RLC status report at corresponding increased frequency, thus updating the source radio network node 120 on which RLC PDUs it has received successfully.

RLC sends status report when the T_Status_prohibit is not running and in one of the following two scenarios getting fulfilled: Polling from the peer RLC entity or T_Reordering expires.

The source radio network node 120 can decrease, e.g. the pollByte Limit value for the user equipment 110 in question when a handover is approaching for that user equipment 110. For example, this may be performed just before starting the handover negotiation with the target radio network node 130, or just after the reception of a measurement report from the user equipment 110. Instead of the pollByte limit parameter, the source radio network node 120 may choose to decrease the value of the pollPdu parameter just as well, or just poll the user equipment 110 more often based e.g. on another measure. On decreasing the pollByte Limit value on the source radio network node 120, the number of polls and RLC status reports between the source radio network node 120 and user equipment 110 will increase compared to the normal case. The source radio network node 120 may configure the T_Status_Prohibit timer of the user equipment 110 such that the T_Status_Prohibit timer does not prohibit the sending of RLC status reports.

The proposed functionality may alternatively be achieved by e.g. decreasing the value of the pollPDU parameter in the RLC configuration of the source radio network node 120 before the handover.

Moreover the proposed functionality can also be achieved by e.g. network RLC polling its peer user equipment RLC every x number of Transmission Timing Interval (TTI), where x is an arbitrary integer 0. According to some embodiments, the polling frequency may be increased by other means, e.g. by using a polling window.

Figure 2:
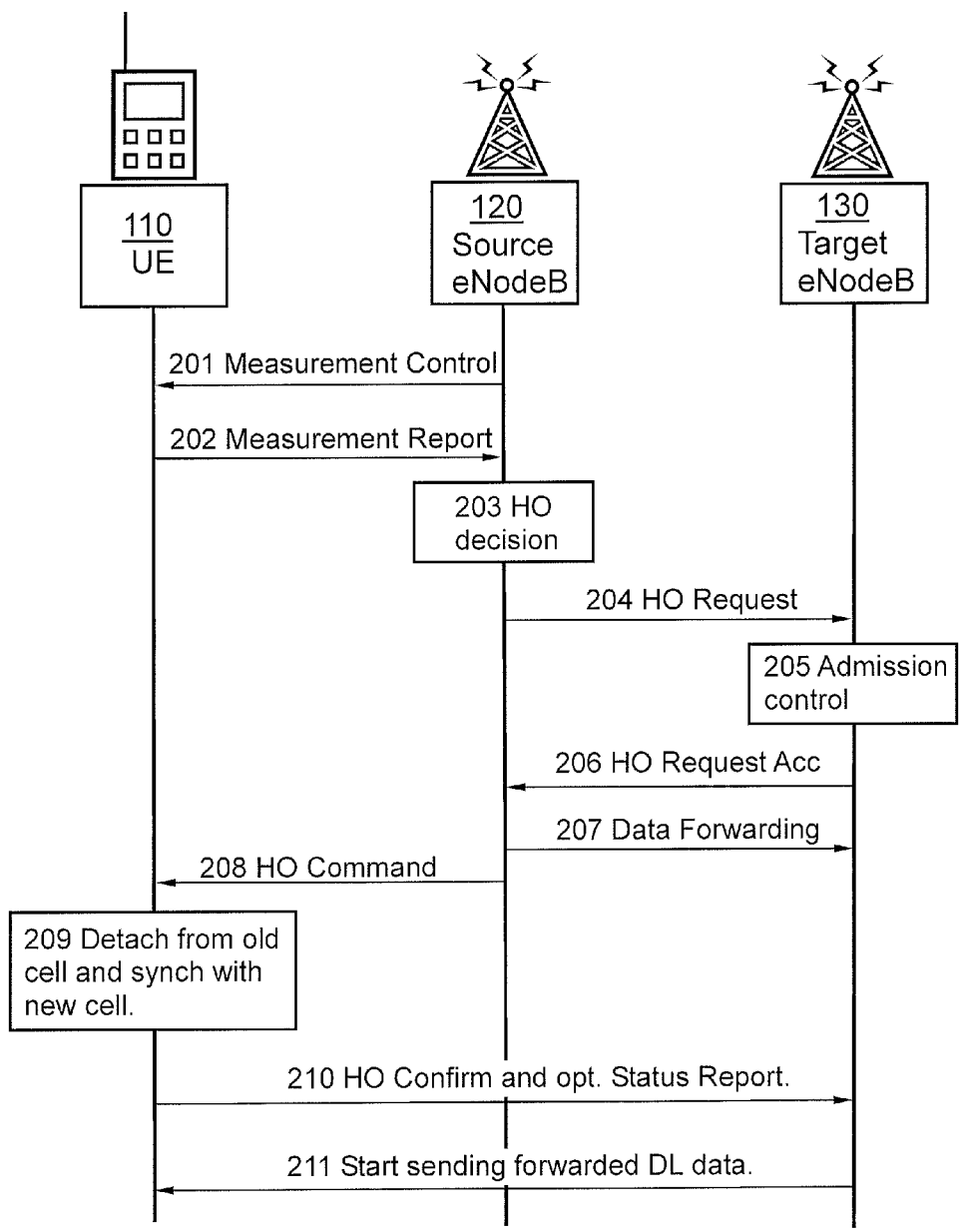
FIG. 2 is a combined signalling scheme and flow chart illustrating embodiments of the present solution.

FIG. 2 depicts message exchange within some nodes of the wireless communication system 100 during the ongoing handover, according to some embodiments of the present solution. In this exemplary illustration, a user equipment 110, a source radio network node 120 and a target radio network node 130 are involved in the handover. ps A number of method steps 201-211 may be performed, according to different embodiments.

Step 201

A Measurement Control message is sent from the source radio network node 120 to the user equipment 110.

Step 202

The user equipment 110 respond to the received Measurement Control message by preparing and sending a Measurement Report to the source radio network node 120.

The Measurement Report may be based on measurements made e.g. on a common pilot channel using a predetermined scheme and may comprise information indicating that an adjacent cell 132 has a higher signal quality than the present source cell 121, possibly with some predetermined threshold factor involved in order to avoid or at least reduce the risk for unnecessarily frequent handovers or toggling between two cells 121, 132.

Thus e.g. if the quality of the target cell 132 is for example 1.5 times better than the quality of the source cell 121, the target cell may be reported as the best cell. The predetermined threshold factor may of course be of any other arbitrary value besides 1.5.

Step 203

Based on the results of the Measurement Report, the source radio network node 120 may determine to perform a handover, and also determine to which node the handover is to be performed, in this case the target radio network node 130. Further, the pollByte limit may be decreased, according to some embodiments.

According to some further embodiments, the source radio network node 120 may generate and send a command to the user equipment 110 in order to increase the status report frequency of the user equipment 110. Thus e.g. the user equipment's 110 T_Status_prohibit timer setting may be tied to the polling. Thus e.g. the T_Status_prohibit timer may be configured to always be 0, so that the RLC of the user equipment 110 sends the status report, whenever the network RLC polls the peer RLC.

Another configured value of the T_Status_prohibit may be e.g. T_Status_prohibit set to 0 at the user equipment RLC, only after user equipment 110 sends measurement report with the high handover causing events. The T_Status_prohibit timer may be reset to its original value, as configured by the network once the handover ends or after some specific time e.g. if the network does not decide to do the handover, according to some embodiments. Here the specific time may be configurable parameter based on e.g. the 3GPP RLC specification timer value, or any other appropriate value.

The new timer may allow the user equipment 110 to ignore the T_Status_prohibit for a certain time after a MEASUREMENT REPORT is sent. In this way the T_Status_prohibit may be configured to any value in normal operation, but at handover the RLC Statuses may be sent more often.

Step 204

A Handover Request is sent from the source radio network node 120 to the target radio network node 130. Thus a request is made e.g. whether the target radio network node 130 has capacity to become the serving node of the user equipment 110. Further, according to some embodiments, the number of polls sent to the user equipment 110 may be increased.

The Handover Request may be sent to the target radio network node 130 over an X2 interface, according to some embodiments.

Step 205

The target radio network node 130 performs an admission control. Thus a check is made if the user equipment 110 may be received.

Step 206

If the target radio network node 130 during the admission control step reaches the conclusion that capacity is available for serving the user equipment 110, a Handover Request Accept message is generated and sent to the source radio network node 120.

The Handover Request Accept message may be sent to the source radio network node 120 over an X2 interface, according to some embodiments.

Step 207

After having received the Handover Request Accept message from the target radio network node 130, the source radio network node 120 forwards data related to the user equipment 110 to the target radio network node 130.

Thus the source radio network node 120 forwards data packets, whose transmission is not yet completed, to the target radio network node 130. The data being forwarded from the RLC entity of the source radio network node 120 to the RLC entity of the target radio network node 130 during handover may comprise e.g. transmitted or non-transmitted PDUs, and/or acknowledgements which have not been received yet.

The forwarding of data may be made to the target radio network node 130 over an X2 interface, according to some embodiments.

Step 208

Also, after having received the Handover Request Accept message from the target radio network node 130, the source radio network node 120 send a Handover Command to the user equipment 110, introducing the target radio network node 130 as the new serving node.

Step 209

When the user equipment 110 receives the Handover Command from the source radio network node 120, the handover from using the source radio network node 120 as serving node, to using the target radio network node 130 as serving node is performed. Thus the user equipment 110 detaches from old cell 121 and synchronise with new cell 132.

Step 210

The user equipment 110 sends a Handover Confirmation and optionally a Status Report to the target radio network node 130, confirming the performed handover to the target radio network node 130.

Step 211

The target radio network node 130 start sending the forwarded downlink data to the user equipment 110.

Further, when the handover has been performed, the user equipment 110 may reconfigure RLC entities, and resume the transmission of data to the target radio network node 130 using the reconfigured RLC entities. Thus, data which has failed to be transmitted in the source cell 121, may be retransmitted in the target cell 132.

Figure 3:
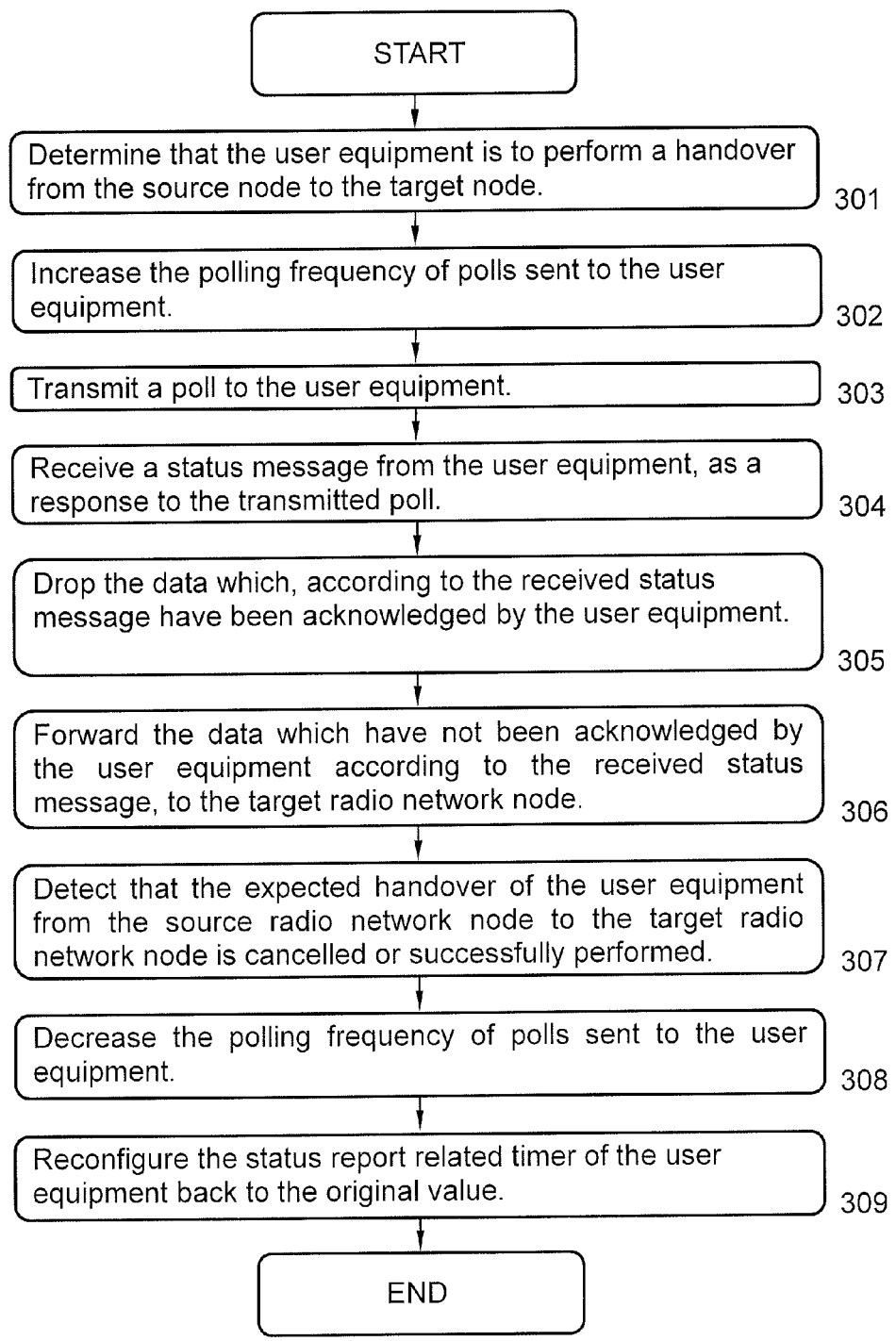
FIG. 3 is a flow chart illustrating method steps in a source radio network node, according to some embodiments.

FIG. 3 is a flow chart illustrating a method in a source radio network node 120. The method aims at reducing the amount of user equipment related data forwarded to a target radio network node 130 from the source radio network node 120. The data is forwarded when performing a handover of a user equipment 110 from the source radio network node 120 to the target radio network node 130.

The source radio network node 120, the target radio network node 130 and the user equipment 110 are comprised in a wireless communication system 100.

The user equipment 110 may according to some embodiments comprise a status report related timer, which optionally may be configured to always be 0.

To appropriately reduce the amount of user equipment related data forwarded to a target radio network node 130 from the source radio network node 120, the method may comprise a number of steps 301-309. It is however to be noted that the method steps 301-309 may be performed in another chronological order than the enumeration indicates and that some of them, e.g. step 302 and step 303, or even all steps may be performed simultaneously, or in an altered, arbitrarily rearranged, decomposed or even completely reversed chronological order. It is further to be noted that some of the presented method steps, e.g. step 307, 308 and/or 309 are optional and may only be performed within some embodiments. The method may comprise the following steps:

Step 301

It is determined that the user equipment 110 is to perform a handover from the source radio network node 120 to the target radio network node 130.

Step 302

The polling frequency of polls sent to the user equipment 110 is increased.

The step of increasing the polling frequency of polls sent to the user equipment 110 may according to some embodiments comprise decreasing the pollByte parameter value for the user equipment 110, in a Radio Link Control configuration.

However, according to some embodiments, the step of increasing the polling frequency of polls sent to the user equipment 110 may optionally comprise decreasing the poll Protocol Data Unit parameter for the user equipment 110, in a Radio Link Control configuration.

Further, according to some embodiments, the step of increasing the polling frequency of polls sent to the user equipment 110 may comprise configuring a status report related timer of the user equipment 110. The status report related timer of the user equipment 110 may be e.g. t-StatusProhibit, according to some embodiments.

Step 303

A poll is transmitted to the user equipment 110.

Step 304

A status message, such as e.g. a Radio Link Control status message, is received from the user equipment 110, as a response to the transmitted poll. However, according to some optional embodiments, the status message may be based on another protocol such as e.g. PDCP.

The status message, such as e.g. a Radio Link Control status message, may comprise, e.g. sequence numbers of RLC PDUs successfully received up to the corresponding time, and sequence numbers of RLC PDUs not being successfully received, according to some embodiments.

Step 305

The data which, according to the received status message, e.g. a Radio Link Control status message, have been successfully acknowledged by the user equipment 110 is dropped.

Thereby the amount of forwarded data may be reduced, as the forwarding of redundant data which were successfully transmitted from the source radio network node 120, but which has not been acknowledged yet by the user equipment 110, and which anyway would have been discarded later by the user equipment 110, is avoided. Thus radio resources are saved, as the amount of data being forwarded from the source radio network node 120 to the target radio network node 130 is reduced. The data may be forwarded over the X2 interface, according to some embodiments.

Step 306

The data which have not been acknowledged by the user equipment 110 according to the received status message, such as e.g. a Radio Link Control status message, is forwarded to the target radio network node 130.

The target radio network node 130 will then in turn forward this data to the user equipment 110 once the handover process is terminated and the target radio network node 130 is established as the new serving node for the user equipment 110.

Step 307

This step is optional and only performed in some embodiments.

It may be detected that the expected handover of the user equipment 110 from the source radio network node 120 to the target radio network node 130 is cancelled or already successfully performed.

Step 308

This step is optional and only performed in some embodiments.

The polling frequency of polls sent to the user equipment 110 may according to some embodiments be decreased.

Step 309

This step is optional and only performed in some embodiments.

The status report related timer of the user equipment 110, e.g. t-StatusProhibit, according to some embodiments, may be reconfigured back to the original value, i.e. the value that was set before the handover procedure started.

Figure 4:
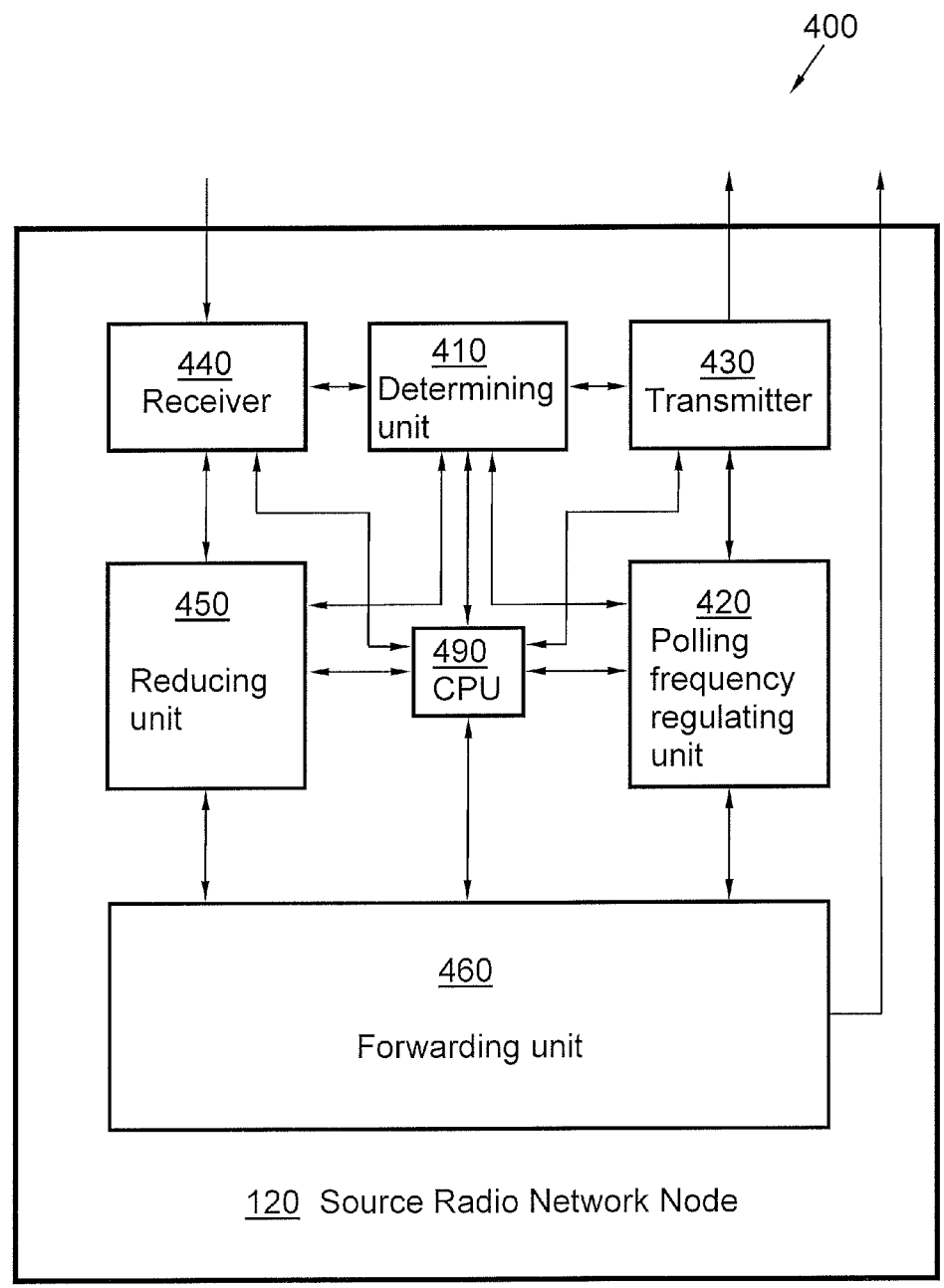
FIG. 4 is a block diagram illustrating an arrangement in a source radio network node, according to some embodiments.

FIG. 4 schematically depicts an embodiment of an arrangement 400 in a source radio network node 120. The arrangement 400 is configured to perform at least some of the above described method steps 301-309. Thus, the arrangement 400 is configured to reduce the amount of user equipment related data forwarded to a target radio network node 130 from the source radio network node 120, when performing a handover of a user equipment 110 from the source radio network node 120 to the target radio network node 130.

The source radio network node 120, the target radio network node 130 and the user equipment 110 are comprised in a wireless communication system 100.

For the sake of clarity and in order not to render unnecessary complications for the reader to understand the functionality and advantages of the present method and arrangement 400, any internal electronics of the source radio network node 120, not completely crucial for understanding the present method according to steps 301-309 has been omitted from FIG. 4.

The arrangement 400 comprises a determining unit 410. The determining unit 410 is adapted to determine that the user equipment 110 is to perform a handover from the source radio network node 120 to the target radio network node 130. Further, the determining unit 410 may optionally be adapted to detect that the expected handover of the user equipment 110 from the source radio network node 120 to the target radio network node 130 is cancelled or successfully performed, according to some embodiments.

Further, the arrangement 400 also comprises a polling frequency regulating unit 420. The polling frequency regulating unit 420 is adapted to adjust the polling frequency of polls sent to the user equipment 110, such as increase or decrease the polling frequency. According to some embodiments, the polling frequency regulating unit 420 may also be adapted to reconfigure the status report related timer of the user equipment 110 back to the original value. The status report related timer of the user equipment 110 may be e.g. t-StatusProhibit, according to some embodiments.

In addition, the arrangement 400 further comprises a transmitter 430. The transmitter 430 is adapted to transmit a poll to the user equipment 110.

Also, the arrangement 400 furthermore comprises a receiver 440. The receiver 440 is adapted to receive a status message, such as e.g. a Radio Link Control status message, from the user equipment 110, as a response to the transmitted poll.

In further addition, the arrangement 400 also comprises a reducing unit 450. The reducing unit 450 is adapted to drop the data which, according to the received status message, such as e.g. a Radio Link Control status message, have been acknowledged by the user equipment 110.

In further yet addition, the arrangement 400 comprises a forwarding unit 460. The forwarding unit 460 is adapted to forward the data which have not been acknowledged by the user equipment 110 according to the received status message, such as e.g. a Radio Link Control status message, to the target radio network node 130.

Optionally, the arrangement 400 also may comprise a Central Processing Unit (CPU) 490, a microprocessor, a Peripheral Interface Controller (PIC) microcontroller or any other appropriate device which may be adapted to interpret computer program instructions and processes data.

It is to be noted that the described units 410-460 comprised within the arrangement 400 in the source radio network node 120 are to be regarded as separate logical entities but not with necessity separate physical entities.

Any, some or all of the units 410-460 may be comprised or co-arranged within the same physical unit. However, in order to facilitate the understanding of the functionality of the arrangement 400, the comprised units 410-460 are illustrated as separate physical units in FIG. 4.

As a non limiting example only, the transmitting unit 430 and the receiving unit 440 may according to some embodiments be comprised within one physical unit, a transceiver, which may comprise a transmitter circuit and a receiver circuit, which respectively transmits outgoing radio frequency signals and receives incoming radio frequency signals, such as e.g. voice call and/or data signals, via an antenna.

Some Particular Embodiments

The present methods for reducing the amount of user equipment related data forwarded to a target radio network node 130 when performing a handover of the user equipment 110 may be implemented through one or more processors 490 in the source radio network node 120, together with computer program code for performing the functions of the methods. The program code mentioned above may also be provided as a computer program product, for instance in the form of a data carrier carrying computer program code for performing the methods according to the present solution when being loaded into the processor unit 490. The data carrier may be a CD ROM disc, a memory stick, or any other appropriate medium such as a disk or tape that can hold machine readable data. The computer program code may furthermore be provided as program code on a server and downloaded to the source radio network node 120 remotely.

Thus a computer readable medium encoded with computer-readable program code for reducing the amount of user equipment related data forwarded to a target radio network node 130 when performing a handover of the user equipment 110 may perform the method steps according to steps 301-309, when the computer-readable program code is loaded into the processor 490.

The terminology used in the detailed description of the particular exemplary embodiments illustrated in the accompanying drawings is not intended to be limiting of the present methods and arrangements. In the drawings, like numbers refer to like elements.

As used herein, the term "and/or" includes any and all combinations of one or more of the associated listed items. The singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. Method in a source radio network node for reducing the amount of user equipment related data forwarded to a target radio network node from the source radio network node, when performing a handover of a user equipment from the source radio network node to the target radio network node, the source radio network node, the target radio network node and the user equipment are comprised in a wireless communication system, the method comprising:
   determining that the user equipment is to perform a handover from the source radio network node to the target radio network node,
   increasing a polling frequency of polls sent from the source radio network node to the user equipment responsive to determining that the user equipment is to perform a handover,
   transmitting a poll from the source radio network node to the user equipment according to the polling frequency,
   receiving a status message from the user equipment, as a response to the transmitted poll,
   dropping data which, according to the received status message have been acknowledged by the user equipment,
   forwarding data which have not been acknowledged by the user equipment according to the received status message, to the target radio network node,
   detecting that the handover of the user equipment from the source radio network node to the target radio network node is cancelled, and
   decreasing the polling frequency of polls sent from the source radio network node to the user equipment in response to the detecting.

2. Method according to claim 1, wherein the status message is a Radio Link Control status message.

3. Method according to claim 2, wherein increasing the polling frequency of polls sent from the source radio network node to the user equipment comprises decreasing a pollByte parameter value in a Radio Link Control configuration of the source radio network node for the user equipment, responsive to determining that the user equipment is to perform a handover.

4. Method according to claim 3,
   wherein decreasing the polling frequency of polls sent to the user equipment in response to the detecting comprises increasing the pollByte parameter value for the user equipment in the Radio Link Control configuration.

5. Method according to claim 2, wherein increasing the polling frequency of polls sent from the source radio network node to the user equipment comprises decreasing a poll Protocol Data Unit parameter in a Radio Link Control configuration of the source radio network node for the user equipment, responsive to determining that the user equipment is to perform a handover.

6. Method according to claim 5, wherein decreasing the polling frequency comprises:
   decreasing the polling frequency of polls sent to the user equipment in response to the detecting by increasing the poll Protocol Data Unit parameter for the user equipment in the Radio Link Control configuration.

7. Method according to claim 1, wherein increasing the polling frequency of polls sent from the source radio network node to the user equipment comprises decreasing a pollByte parameter value in a Radio Link Control configuration of the source radio network node for the user equipment, responsive to determining that the user equipment is to perform a handover.

8. Method according to claim 1, wherein increasing the polling frequency of polls sent from the source radio network node to the user equipment comprises decreasing a poll Protocol Data Unit parameter in a Radio Link Control configuration of the source radio network node for the user equipment, responsive to determining that the user equipment is to perform a handover.

9. Method according to claim 1 wherein increasing the polling frequency comprises increasing the polling frequency of polls sent from the source radio network node to the user equipment responsive to determining that the user equipment is to perform the handover from the source radio network node to the target radio network node.

10. Method according to claim 1 wherein increasing the polling frequency comprises increasing the polling frequency of polls sent from the source radio network node to the user equipment after determining that the user equipment is to perform the handover from the source radio network node to the target radio network node.

11. The method according to Claim 1 further comprising:
determining at the source radio network node that there is outstanding data in an RLC transmitter buffer; and
wherein increasing the polling frequency comprises increasing the polling frequency of polls sent from the source radio network node to the user equipment responsive to determining that the user equipment is to perform the handover and determining that there is outstanding data in the RLC transmitter buffer.

12. The method according to claim 1, wherein increasing the polling frequency comprises modifying a parameter of a Radio Link Control configuration of the source radio network node responsive to determining that the user equipment is to perform a handover.

\* \* \* \* \*

UNITED STATES PATENT AND TRADEMARK OFFICE
CERTIFICATE OF CORRECTION

Page 1 of 1

PATENT NO.       : 9,191,870 B2
APPLICATION NO.  : 13/388030
DATED            : November 17, 2015
INVENTOR(S)      : Larmo et al.

It is certified that error appears in the above-identified patent and that said Letters Patent is hereby corrected as shown below:

IN THE SPECIFICATION

In Column 6, Line 33, delete "pollPdu" and insert -- pollPDU --, therefor.

In Column 6, Line 50, delete "integer 0." and insert -- integer $\geq 0$. --, therefor.

In Column 6, Line 58, delete "handover. ps" and insert -- handover. --, therefor.

IN THE CLAIMS

In Column 12, Line 13, in Claim 1, delete "Method" and insert -- A method --, therefor.

In Column 12, Line 43, in Claim 2, delete "Method" and insert -- The method --, therefor.

In Column 12, Line 45, in Claim 3, delete "Method" and insert -- The method --, therefor.

In Column 12, Line 52, in Claim 4, delete "Method" and insert -- The method --, therefor.

In Column 12, Line 57, in Claim 5, delete "Method" and insert -- The method --, therefor.

In Column 12, Line 64, in Claim 6, delete "Method" and insert -- The method --, therefor.

In Column 13, Line 3, in Claim 7, delete "Method" and insert -- The method --, therefor.

In Column 13, Line 10, in Claim 8, delete "Method" and insert -- The method --, therefor.

In Column 13, Line 17, in Claim 9, delete "Method" and insert -- The method --, therefor.

In Column 14, Line 1, in Claim 10, delete "Method" and insert -- The method --, therefor.

Signed and Sealed this
Fifth Day of April, 2016

Michelle K. Lee
*Director of the United States Patent and Trademark Office*